Sept. 9, 1969   J. E. BUNNER ET AL   3,466,480
COMMUTATION IMPROVEMENT FOR DYNAMOELECTRIC MACHINE
Filed April 14, 1967   3 Sheets-Sheet 1

INVENTORS
JAMES E. BUNNER
DANIEL L. GRIFFIS
BY *Edward H. Goebel*
THEIR ATTORNEY

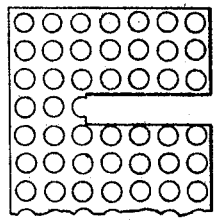
FIG.3(a)
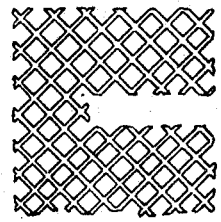
FIG.3(b)
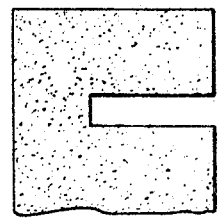
FIG.3(c)
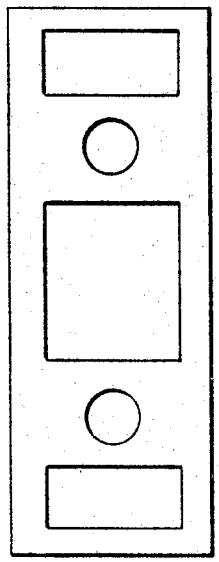
FIG.3(d)
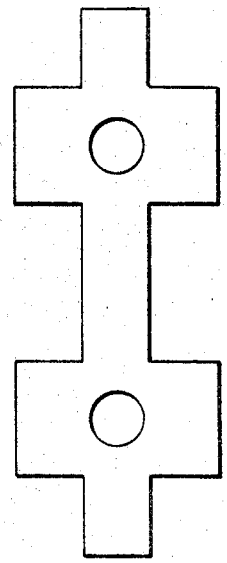
FIG.3(e)
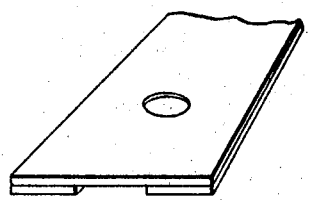
FIG.3(f)
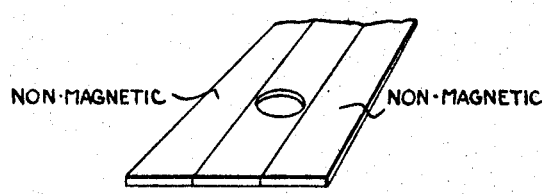
FIG.3(g)
FIG. 3

United States Patent Office 3,466,480
Patented Sept. 9, 1969

3,466,480
COMMUTATION IMPROVEMENT FOR DYNAMO-
ELECTRIC MACHINE
James E. Bunner and Daniel L. Griffis, Erie, Pa., assignors to General Electric Company, a corporation of New York
Filed Apr. 14, 1967, Ser. No. 631,051
Int. Cl. H02k 1/12, 1/18
U.S. Cl. 310—218                                    4 Claims

ABSTRACT OF THE DISCLOSURE

Partially magnetic shims made up of both a magnetic substance such as iron and a non-magnetic substance such as air are used between the commutating poles and the yoke of a dynamoelectric machine, having convex shaped black band commutating characteristics which indicate that commutation is poor in the higher load range of the machine, to non-linearly change the commutating characteristics of this machine over its range of loads. In each of these partially magnetic shims, which may comprise materials such as expanded steel or perforated steel, the ratio of the volume of the magnetic substance to the volume of the non-magnetic substance is specifically chosen to allow the magnetic substance to saturate over a preselected range of increasing percentages of full load of the machine to increase the series reluctance of the magnetic circuit of the commutating circuit. The thickness of the partially magnetic shims is specifically chosen to add the series reluctance to the commutating circuit which compensates for the poor commutating characteristics of the machine at the higher machine loads where the shims are saturated.

BACKGROUND OF THE INVENTION

This invention relates to direct-current dynamoelectric machines, and more particularly, to the adjustment of the commutating field strength of such machines to prevent brush sparking.

It is well known in the art to provide direct-current dynamoelectric machines with commutating poles, also called interpoles, to neutralize the reactive voltage induced in short-circuited armature coils undergoing commutation, that is, undergoing a reversal in the direction of current flow through them while short-circuited by a brush, and thereby prevent brush sparking. These commutating poles, ordinarily placed midway between the main field poles, are provided with a winding which produces a flux essentially proportional to the armature current level. The armature rotation plus this flux generates a speed-voltage in the short-circuited armature coil which is in the proper direction to neutralize the reactive voltage and thus allow the reversal of current flow to occur in a substantially linear manner. Commutating poles are usually so effective in providing acceptable commutating characteristics that they are required on almost all high output machines.

One effective manner of determining the commutating characteristics of a direct-current, dynamoelectric machine is by the "black band method" of commutation observation which measures the overload and transient load commutation adjustment of such a machine. Briefly, this method of judging commutation performance comprises a visual determination of the band of variable commutating field strengths in which commutation occurs without sparking at the brushes or, in other words, is "black." This band is obtained by using a separate current source to first oppose (buck) and then aid (boost) the load current flowing through the commutating field coils at various loads on the machine. An observation is made at each measured load of the level of bucking and boosting current required to just begin a sparking at the brushes of the machine. These levels of bucking and boosting current are plotted separately on a graph to provide curves which show when sparking occurs over the measured range of machine loads. The resulting curves represent the "black band" of commutation field strengths. "The Black Band Method of Commutation Observation" is more fully explained in American Institute of Electrical Engineers Technical Paper 40–138 of the same name, which was presented at the AIEE Middle Eastern District meeting, Cincinnati, Ohio, October 9–11, 1940, and is intended to be incorporated herein by reference.

A wide black band having limits which remain substantially constant with changes in load and are equally displaced in the bucking current and boosting current directions is most favorable for a machine which is operated with overloads and frequent transient loading conditions. A wide black band indicates that a machine is more likely to have spark-free commutation during transient loading periods. During these periods the changes in commutating field flux lag the changes in the armature current due to hysteresis and eddy current effects in the magnetic circuit. The lagging changes in field flux which are present when the machine load is being increased affect commutation in the same manner as the bucking current, and the lagging changes in field flux present when the machine load is being decreased affect commutation in the same manner as the boosting current. A black band having substantially constant limits indicates that a machine responds equally to transient load changes over its total range of loads, while a black band equally displaced in the bucking current and boosting current directions indicates that a machine responds equally to transient increases and decreases in its load.

It has been found that a convex black band, indicating poor commutation at high loads, usually exists for direct-current machines having a high power rating as related to machine diameter; for direct-current machines requiring a larger number of turns on the commutating poles than needed for steady state commutation (and a corresponding increase in the reluctance of the commutating field path) to improve transient commutation characteristics; or for direct-current machines designed for large overloads, in which the commutating pole pieces are made large to avoid their saturation. This convex black band is particularly undesirable for direct-current machines which are repeatedly operated at large overloads for short periods of time.

Objects of the invention

Therefore, it is an object of this invention to provide direct-current dynamoelectric machines of the type referred to above which can be conveniently adjusted to have substantially linear black band commutating characteristics.

It is another object of this invention to provide direct-current dynamoelectric machines having commutating characteristics which can be conveniently adjusted to change in a predictably non-linear manner during the operation of the machine.

It is a further object of this invention to provide a direct-current dynamoelectric machine which can conveniently have its high load commutating field strength decreased by controllable amounts without removing the commutating poles from the machine to control the amount of this decrease in field strength.

Summary of the invention

Briefly stated, and in accordance with one aspect of this invention, means separate from a commutating pole member of a dynamoelectric machine provides a non-linear series reluctance for the commutating magnetic circuit of the machine. This means comprises a combination of magnetic and non-magnetic substances in which the ratio of the volume of the magnetic substance to the volume of the non-magnetic substance causes the magnetic substance to saturate over a preselected range of percentages of full load of the machine and thereby changes the commutation characteristics at this percentage of full load.

The novel features believed characteristic of this invention are set forth with particularity in the appended claims. The invention itself, however, together with further objects and advantages thereof, may best be understood by reference to the following description taken in conjunction with the accompanying drawings.

Brief description of the drawings

FIG. 3 shows a number of the partial magnetic shims which may be used in accordance with this invention.

Description of a preferred embodiment

Figure 1:
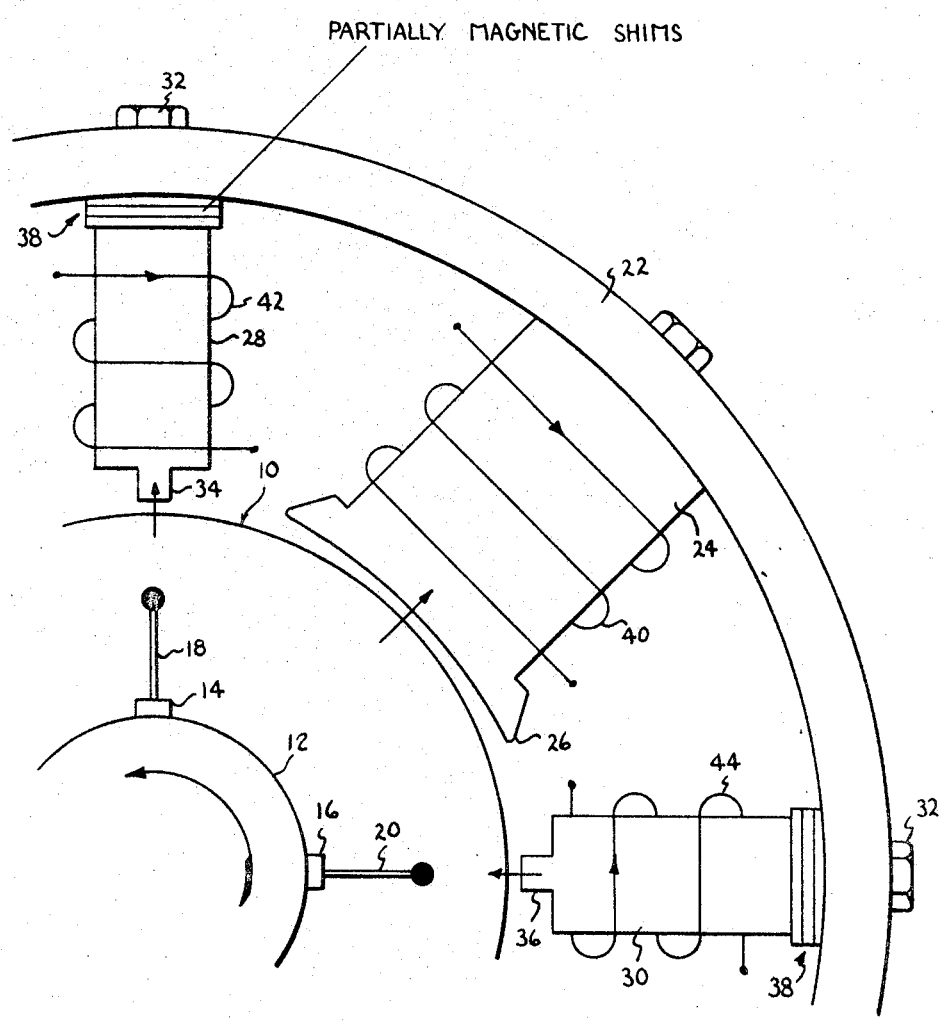
FIG. 1 is a partial schematic diagram of the electromagnetic circuit of a dynamoelectric machine utilizing this invention.

In FIG. 1 there is shown a partial schematic diagram of a direct-current dynamoelectric machine, assumed to be a direct-current motor for illustrative purposes only. The motor comprises an armature 10, which may be of any desired type, having a commutator 12 to which power is supplied by brushes 14 and 16 connected through leads 18 and 20, respectively, to any suitable power source.

Magnetic excitation is provided to the armature 10 by a field structure arranged as the stationary member of the motor, with the armature rotating in the direction of the arrow in FIG. 1. The field structure includes a partially-shown magnetic yoke 22 and a main field polar member 24, one of a plurality of such members mounted about the inside periphery of the yoke 22. One end of the polar member is contiguous with the yoke 22, while the other end defines a main pole shoe 26.

Commutating pole members 28 and 30 are mounted adjacent the yoke 22 on each side of the main pole member 24. Usually the commutating pole members are mounted on the yoke of a machine, as by the bolts 32, so that the center of a commutating pole shoe, such as 34 and 36, is located midway between adjacent field pole shoes.

It is well known in the art that the slope of the black band of a dynamoelectric machine varies directly with the flux per ampere of current in commutating coils which actually flows from the commutating pole tips to counteract the reactive voltage induced in the short-circuited armature coils. Therefore, the slope of the limits of the black band can be adjusted over a wide range by varying the reluctance of the commutating magnetic circuit. Once the machine is assembled, the change in reluctance required to produce a desired change in the slope of these limits is calculated using this theory. However, the methods of calculation are not generally as accurate as required for satisfactory machine operation, and the final adjustments of the commutating field must be made by trial and error.

The air gap of the commutating pole, conveniently shown to be substantially similar to that of the main field pole, can be adjusted to obtain optimum commutating characteristics by loosening the bolts 32 and either adding to or subtracting from the number of shims 38 placed between the commutating pole members 28 and 30 and the yoke 22 to change the reluctance of the commutating magnetic circuit.

Normally, the shims 38 comprise two types: magnetic shims made, for example, of soft iron and non-magnetic shims made, for example, of non-magnetic material such as aluminum. Magnetic shims conduct the magnetic flux of the commutating circuit without appreciably affecting the commutating field strength and are added to reduce the air gap and thus the reluctance. Non-magnetic shims made of material such as aluminum provide a series reluctance in the magnetic commutating circuit which decreases the strength of the commutating field. Each of these shims, along with the air gap between the commutating pole tips and the armature, a non-magnetic substance itself, provides a means for adjusting the reluctance of the commutating magnetic field. However, since the magnetic field is stronger near the yoke than near the pole tips, often from one and one-half to two times as strong, the shims provide a larger reluctance than does the air gap.

In accordance with this invention, a third type of shim, which is partially magnetic and partially non-magnetic, can be added between a commutating pole member and the yoke 22. During a low load range of the motor, this partially magnetic shim acts substantially like an ordinary magnetic shim. However, during a higher load range of the motor when its commutating field strength increases, the partially magnetic shim saturates and thus provides a higher series reluctance for the commutating magnetic circuit as if it were a non-magnetic shim. The ratio of the volume of a magnetic substance of the shim, such as iron, to the volume of the non-magnetic substance of the shim, such as air, is chosen that at a preselected percentage of full load of the motor the shim saturates and adds a series reluctance proportional to the thickness of the shim to the commutating magnetic circuit. This partially magnetic shim thus has a non-linear effect on the commutating characteristics of the motor over the full load-range of the motor.

The pole member 24 is arranged to be excited by a coil 40 of the magnetic excitation circuit of the motor. The coil 40 may be excited in any appropriate manner, as, for example, by connecting it in series with the armature circuit of the motor so that the resulting field strength is in the direction of the arrow at the main pole shoe 26 and varies with the armature current level. Alternatively, the coil 40 may be shunt excited or separately excited or may comprise a compound excited coil.

As is well known in the art, commutating coils 42 and 44, wound around the commutating pole members 28 and 30, respectively, are excited in proportion to the load of the motor. These coils are normally connected in series with the armature circuit of the motor so that as the motor load increases, the commutating field can counteract the increasing armature reactive voltage which is developed as an armature coil undergoing commutation is short-circuited by a brush.

Figure 2:
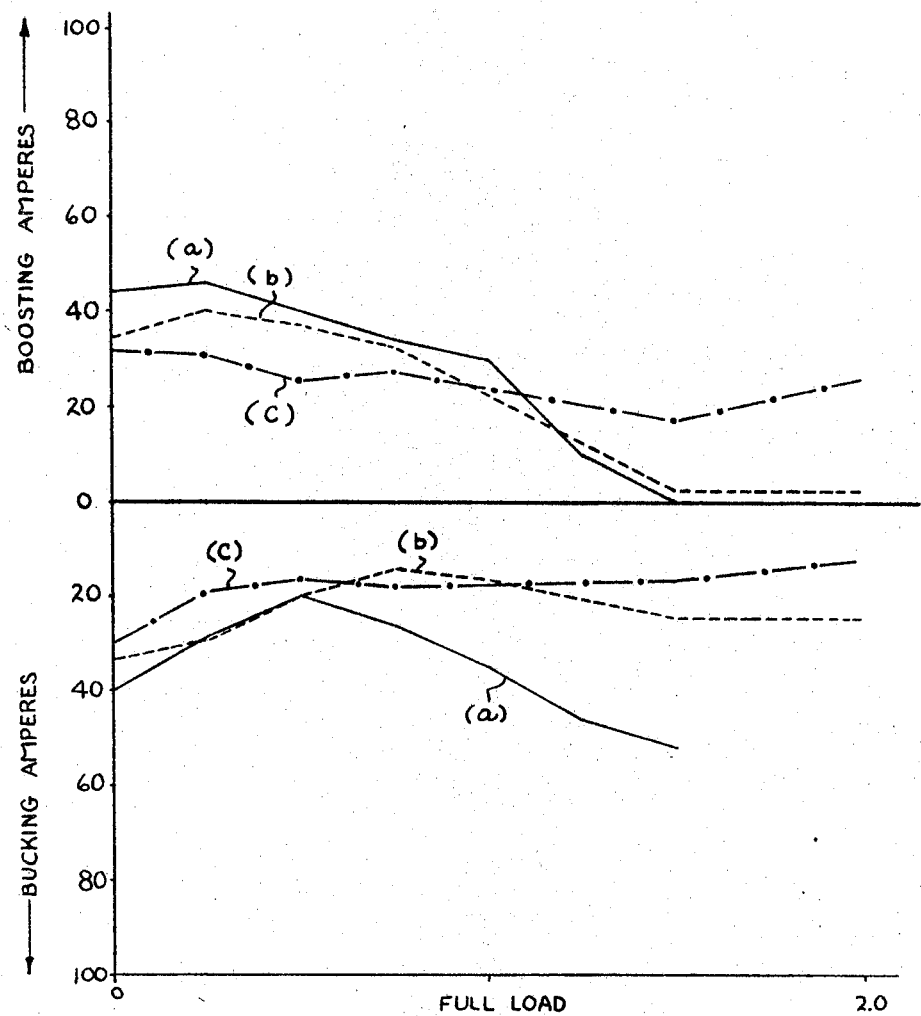
FIG. 2 shows the black band commutation characteristics of a dynamoelectric machine which was adjusted in accordance with this invention.

The solid line curves marked $a$ in FIG. 2 show a convex black band characteristic of a typical dynamoelectric machine of the type referred to in the "Background of the Invention." This machine had its commutating field strength adjusted by varying the numbers of magnetic and non-magnetic shims between the commutating pole member and the machine yoke until the combination of these shims and the air gap between the commutating pole shoes and the armature coils produced the most favorable commutating characteristics. Note from the convex shape of the black band that commutation is poor at overloads of the machine. Resulting heavy sparking at overloads can damage the brushes and the commutator, increasing the maintenance of the machine or requiring that a more expensive machine having a larger yoke diameter be used for more maintenance-free operation in this range of loads.

Since the commutating characteristics of this machine resulted from the shapes and sizes of the magnetic circuit members of the machine, the convex commutating characteristics could be changed by dismantling and changing portions of the machine. For example, the commutating pole members might be removed from the machine and their structure revised in an attempt to change the convex shape of the black band to a more linear shape. However, this is a very time-consuming, tedious, and expensive manner of changing the commutating characteristics because changes would be made in these members by empirical methods which rely on the trial and error approach. In accordance with this invention, the commutating characteristics are more conveniently changed, for example, by merely loosening the bolts which fasten the commutating pole members onto the yoke of the machine and changing the commutating magnetic circuit in a non-linear manner by placing partially magnetic shims between the commutating pole members and the yoke. The bolts are then tightened and the commutating characteristics are tested again by determining the black band of the machine. Thus, means separate from the commutating pole members are used to provide a non-linear reluctance for the commutating magnetic circuit.

More specifically, with respect to the machine whose characteristics are shown in FIG. 2, the most favorable commutating characteristics were determined by using the magnetic and non-magnetic shims to change the air gap as explained above. Thereafter, when it was observed that the black band had the convex shape outlined by the solid line curves a, magnetic shims were added between the commutating pole member and the yoke to increase the field strength and change the slope of the black band to substantially flatten the initial portion of the black band. Next a determination was made of the approximate reluctance needed in the higher motor-load range to substantially flatten the black band in this load range, that is, to make it appear to be an extension of the now horizontal initial portion of the black band. Magnetic steel shims were then replaced by partially magnetic shims which, when saturated by the commutating field, would appropriately bend the black band characteristics in the higher load range to make them lie on a horizontal line in FIG. 2 as an extension of the initial portion of the black band.

In order to determine the ratio of the volume of the magnetic material to the volume of the non-magnetic material of the partially magnetic shims, the flux density of the magnetic circuit where the shims were to be added was determined. The flux density at the back of the commutating pole member at full load of the machine whose black band is illustrated in FIG. 2 was determined to be 33 kilolines per square inch of the shim material. Since as a rule of thumb ordinary soft iron is assumed to saturate approximately between 90 and 120 kilolines per square inch of material, and since the black band of this machine begins to bend downward in a harmful manner at approximately full load, the partially magnetic shim was chosen to have one-third of its area made up of magnetic material: steel. Thus, the partially magnetic shims would begin to saturate around full load. Saturation of iron does not occur at a specific field strength, but extends over a range of field strengths, corresponding to a range of machine loads. It is contemplated that the partially magnetic shim discussed above would be completely saturated at double load.

The dotted line curves b of FIG. 2 outline the black band of the same machine after the partially magnetic shims were added to its commutating magnetic circuits. This black band still had a substantially convex shape. In order to further correct the shape of this black band, more of the magnetic shims were removed and replaced by partially magnetic shims. The resulting black band, which was thought to be very favorable for the operation of the machine, is outlined by the dot-dashed line curves c in FIG. 2. Further experimentation could have made the limits of the black band more linear, but this was thought to be unnecessary.

If the black band a had bent downward at a lesser load than shown, a smaller percentage of the volume of the partially magnetic shim would have been magnetic material. This partially magnetic shim would begin to saturate at a lesser load and would be fully saturated sooner than the partially magnetic shim of the example shown. From a practical standpoint, the minimum percentage of magnetic material in a shim would be around 20%. If the black band had bent downward at a greater load, a larger percentage of the volume of the partially magnetic shim would have been magnetic material, up to a practical maximum limit of approximately 80% magnetic material. The ratio of the magnetic to non-magnetic material is a function of the field strength where the shims (or other partially magnetic material) are added, the flux lines per unit of area needed to saturate the shims, and the range of machine loads (or point in the machine load for sharply saturating substances such as nickel alloys) over which saturation is to occur.

FIG. 3 shows a number of partially magnetic shims which may be used to non-linearly change the commutating characteristics of a dynamoelectric machine in accordance with this invention. Preferably, the shims are slotted, as are the shims shown as FIG. 3(a)–(c), to enable them to be more easily added to the commutating magnetic circuit.

The partially magnetic shims shown in FIG. 3(a) and (b) are the most preferred shims of those shown because they are made of readily available stock material: perforated steel for the shim of FIG. 3(a) and expanded steel for the shim of FIG. 3(b), each of which can be obtained with prescribed ratios of steel to air per unit of volume. For these shims and the shims shown in FIG. 3(d)–(f) the non-magnetic substance is preferably air, while the magnetic substance is preferably steel. The shim shown in FIG. 3(c) comprises a sintered or cast substance made up of iron particles mixed with non-magnetic particles such as aluminum, brass, epoxy, etc. FIG. 3(g) shows a partially magnetic shim made up of a strip of magnetic material sandwiched between two strips of non-magnetic material.

It is contemplated that partially magnetic material may be added in other portions of the commutating magnetic circuit to nonlinearly vary the series reluctance of this circuit in accordance with this invention or that the preferred embodiment might be changed while the advantages of this invention are retained. Therefore, it is intended that the following claims define the scope and breadth of this invention.

What we claim as new and desire to secure by Letters Patent of the United States is:

1. In a direct-current dynamoelectric machine which includes commutating poles comprising commutating pole members which are magnetically energized by commutating coils in proportion to the load of said machine, a yoke made of magnetic material, and means for adjustably mounting said commutating pole members at the inside periphery of said yoke, said machine having convex shaped black band commutating characteristics which indicate that commutation is poor in the higher load range of said machine, the improvement comprising:

partially magnetic shims added between said commutating pole members and said yoke for providing a non-linear series reluctance for the commutating magnetic circuit, each of said shims comprising the combination of a magnetic substance and a non-magnetic substance in which the ratio of the volume of the magnetic substance to the volume of the non-magnetic substance allows the magnetic substance to saturate over a preselected range of increasing percentages of full load of the machine to increase the series reluctance of the commutating magnetic circuit, the thickness of said shims being sufficient to add a series reluctance to the commutating magnetic circuit at the higher machine loads, where said shims are being saturated, which compensates for the poor commutating characteristics of the machine at these higher loads.

2. A dynamoelectric machine according to claim 1 in which the magnetic substance is steel and the non-magnetic substance of said partially magnetic shims is air.

3. A dynamoelectric machine according to claim 2 wherein said partially magnetic shims comprise perforated steel.

4. A dynamoelectric machine according to claim 2 wherein said partially magnetic shims comprise expanded steel.

References Cited

UNITED STATES PATENTS 1,243,966  10/1917  Nichols _____ 310—220

FOREIGN PATENTS 968,646  9/1964  Great Britain.
951,515  10/1956  Germany.
1,011,939  7/1952  France.

WARREN E. RAY, Primary Examiner

R. SKUDY, Assistant Examiner

U.S. Cl. X.R.

310—254